Patented Aug. 29, 1944

2,356,801

UNITED STATES PATENT OFFICE 2,356,801

INSECT REPELLENT COMPOSITION

Bernard V. Travis and Howard A. Jones, Orlando, Fla., assignors to the United States of America, as represented by Claude R. Wickard, Secretary of Agriculture, and his successors in office.

No Drawing. Application April 8, 1944, Serial No. 530,232

4 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to an improved insect repellent composition.

The principal object of this invention is to provide an effective and long lasting insect repellent composition that may be applied to the skin, clothing or other surface from which it is desired to repel insects.

A further object is to provide an insect repellent composition that is effective in repelling a wider variety of insect pests than any material previously known.

Insect repellents are of value in preventing annoyance from insect pests, but are of still greater value as an aid in controlling insect-borne diseases. They are applicable in situations where other methods of insect control are impractical. They are particularly useful in protecting men in movement through insect-infested areas, such as is the case with troops in active military campaigns.

We have found that a composition comprising ternary solutions of certain known repellents is more effective in repelling insects than could be predicted as a result of the additive effect of the components. The composition of this invention represents a striking case of synergism in the field of insect repellent action. Furthermore, this composition is consistently effective in repelling a number of species of insects against which the individual ingredients of the mixture when used alone give varied and inferior repellency.

The materials comprising this composition are dimethyl phthalate, 2-ethyl-1,3-hexanediol, and n-butyl mesityl oxide oxalate. These substances are already known individually to possess repellent action to various species of insects. We have found, however, that when these substances are combined in certain proportions the resulting composition has a repellent value far greater than would be expected from the known repellent values of the components.

The three ternary solutions on which considerable work has been done and which have shown particularly good repellent results are those comprising, by percentages, respectively, 60—20—20, 80—10—10, and 33⅓—33⅓—33⅓, of dimethyl phthalate, 2-ethyl-1,3-hexanediol and n-butyl mesityl oxide oxalate. All percentages are by volume at 30° C. These solutions are prepared by simple addition and stirring of the ingredients.

In testing the repellent properties of such compositions in the laboratory, the material to be tested was applied to the forearm at the rate of 1 ml. from wrist to elbow. The arm was then put in a cage containing a large number of hungry mosquitoes or other biting insects and the time elapsing until the first bite was recorded. Similar tests were made in the field where the treated arm was exposed to an insect population of high density and the time to the first bite noted. The laboratory tests are highly indicative of the value of a repellent in actual practical use and results correspond well with values obtained in the field. The field tests constitute an actual trial of the material under practical conditions.

The results of a large number of tests obtained with the composition comprising 60 percent dimethyl phthalate, 20 percent 2-ethyl-1,3-hexanediol, 20 percent n-butyl mesityl oxide oxalate when tested by these methods are shown in the table.

TABLE

Relative effectiveness of a 60–20–20 mixture of dimethyl phthalate, 2-ethyl-1,3-hexanediol, n-butyl mesityl oxide oxalate, as measured by the average repellent time in minutes

| Species and type of test | Dimethyl phthalate | 2-ethyl-1,3-hexanediol | n-Butyl mesityl oxide oxalate | 60-20-20 mixture |
|---|---|---|---|---|
| Anopheles quadrimaculatus (laboratory) | 206 | 78 | 30 | 257 |
| Aedes aegypti (laboratory) | 234 | 363 | 160 | 321 |
| Aedes taeniorhynchus (field) | 153 | 276 | 164 | 212 |
| Stomoxys calcitrans (laboratory) | 47 | 101 | 171 | 189 |

The unusual increase in repellent time obtained on combining the three components is apparent. In all cases the repellent time with the 60–20–20 composition is greater than would be expected from mixing the ingredients in this proportion, and against two of the species (Anopheles quadrimaculatus and Stomoxys calcitrans) it is actually greater than the repellent times of any of the individual components. The consistently high repellent results obtained with the 60–20–20 mixture with all species compared with the varied results with the individual ingredients is an important feature of the composition.

As already mentioned, the composition (60–20–

20) shows a marked increase in effectiveness over the individual components against *Anopheles quadrimaculatus*. This is of particular importance as this species is one of the important vectors of malaria.

The compositions containing 80 percent dimethyl phthalate, 10 percent 2-ethyl-1,3-hexanediol, and 10 percent n-butyl mesityl oxide oxalate, and 33⅓ percent dimethyl phthalate, 33⅓ percent 2-ethyl-1,3-hexanediol, and 33⅓ percent n-butyl mesityl oxide oxalate have been found to possess similar synergistic repellent properties. This invention is not limited, however, to the foregoing examples. The proportions of the three components may be varied over a wide range.

Further, the aforementioned examples are not to be construed as limiting either the mode of application of this composition or the kinds of insects which it may be used to repel. The composition is not only an excellent repellent when it is applied to the skin, but it has also been applied to clothing and other surfaces and found to be highly effective in repelling insects. The composition may be used against a number of species of insects other than those cited above with equally satisfactory results. For example, the composition has given good results with *Eusimulium pecuarum*, and with several species of Aedes in Canada and Oregon.

The insect repellent composition herein described may cause a slight, temporary stinging sensation when applied undiluted to the more sensitive areas of the skin. However, the composition has been found in extensive tests over a long period of time to be toxicologically safe for repeated application to the human skin.

Our insect repellent composition may be applied alone or in combination with various inert diluents such as mineral or vegetable oils, or ethyl alcohol. It may also be used in mixtures with other repellents.

Having thus described our invention, we claim:

1. An insect repellent composition containing as an essential active ingredient a ternary solution comprising by volume from 33⅓ percent to 80 percent of dimethyl phthalate, and complementary equal parts of 2-ethyl-1,3-hexanediol and n-butyl mesityl oxide oxalate.

2. An insect repellent composition containing as an essential active ingredient a ternary solution comprising by volume 60 percent of dimethyl phthalate, 20 percent of 2-ethyl-1,3-hexanediol, and 20 percent of n-butyl mesityl oxide oxalate.

3. An insect repellent composition containing as an essential active ingredient a ternary solution comprising by volume 80 percent of dimethyl phthalate, 10 percent of 2-ethyl-1,3-hexanediol, and 10 percent of n-butyl mesityl oxide oxalate.

4. An insect repellent composition containing as an essential active ingredient a ternary solution of equal parts by volume of dimethyl phthalate, 2-ethyl-1,3-hexanediol, and n-butyl mesityl oxide oxalate.

BERNARD V. TRAVIS.
HOWARD A. JONES.